United States Patent [19]

Darwin et al.

[11] Patent Number: 5,665,158
[45] Date of Patent: Sep. 9, 1997

[54] CEMENT ADMIXTURE PRODUCT

[75] Inventors: David Charles Darwin, Columbia; Ellis Martin Gartner, Silver Spring, both of Md.

[73] Assignee: W. R. Grace & Co.-Conn., New York, N.Y.

[21] Appl. No.: 505,985

[22] Filed: Jul. 24, 1995

[51] Int. Cl.$^6$ .................................................. C04B 24/12
[52] U.S. Cl. ........................... 106/808; 106/802; 106/823; 524/2; 524/650
[58] Field of Search ........................... 106/696, 708, 106/709, 724, 727, 802, 808, 823; 524/2, 650

[56] References Cited

U.S. PATENT DOCUMENTS

| | | | |
|---|---|---|---|
| 4,471,100 | 9/1984 | Tsubakamito | 525/367 |
| 4,589,995 | 5/1986 | Fukumoto | 252/180 |
| 4,745,159 | 5/1988 | Anzai | 525/329.9 |
| 4,946,904 | 8/1990 | Akimoto | 106/802 |
| 4,968,755 | 11/1990 | Canova | 525/330.4 |
| 5,021,514 | 6/1991 | Canova | 525/330.4 |
| 5,142,036 | 8/1992 | Akimoto | 106/823 |
| 5,237,017 | 8/1993 | Akiyama | 525/366 |
| 5,358,566 | 10/1994 | Tanaka | 106/823 |
| 5,393,343 | 2/1995 | Darwin | 106/808 |

FOREIGN PATENT DOCUMENTS

| | | |
|---|---|---|
| 0331052 | 2/1989 | European Pat. Off. . |
| 57-57706 | 4/1982 | Japan . |
| 58-147413 | 9/1983 | Japan . |
| 62-70250 | 3/1987 | Japan . |
| 62-78137 | 4/1987 | Japan . |
| 6-47788 | 9/1995 | Japan . |

*Primary Examiner*—Michael Marcheschi
*Attorney, Agent, or Firm*—Howard J. Troffkin

[57] ABSTRACT

The present invention is directed to a polyoxyalkylene ammonium salt of an imidized polycarboxylic acid polymer cement admixture, storage stable aqueous solutions of said polymer, and to improved cement compositions containing said polymer.

6 Claims, No Drawings

CEMENT ADMIXTURE PRODUCT

BACKGROUND OF THE INVENTION

The present invention is directed to a superplasticizer admixture for hydraulic cement compositions and to the resultant improved hydraulic cement composition. Specifically, the present invention relates to hydraulic cement compositions having certain derivatives of polyacrylic acid polymers, as fully described hereinbelow, which are capable of imparting the combined properties of high flowability to the treated composition, retention of high flowability over a sustained period of time without imparting a significant delay in the initial set time and controlling air voids in the set composition in amounts and of the nature to impart strength and/or durability to the resultant formation.

Hydraulic cements, such as Portland cement, are useful in forming structural formations, such as building members, precast members and the like. These hydraulic cements are mixed with aggregate to form mortars (cement, small aggregate, such as sand, and water) or concrete (cement, small aggregate, large aggregate, such as stone, and water) formations. It is highly desired to increase the flow (slump) properties of the initially formed hydraulic cement composition to aid in placement of the composition and to extend the period of high flowability in order to provide working time to finish the placement of the structure. While extending the period of time that high slump is imparted to a cement composition, it is not desired to have the initial set time significantly delayed as such delay would disrupt the desired work schedule and delay completion of the structural formation.

Increased flowability can be attained by using large dosages of water in the hydrating cement composition. However, it is well known that the resultant cement based structure will have poor compressive strength and related properties which will make it unsuitable as a structural formation. Various additives have been proposed to increase the flowability to hydraulic cement compositions without increasing the water content of the initially formed composition. Such additives have been classified as "cement superplasticizers" and include, for example, compounds such as naphthalene sulfonate-formaldehyde condensates, lignin sulfonates and the like. In certain instances, the superplasticizers have been used as a means of reducing the water to cement ratio in the composition (to enhance the strength of the resultant structure) without detracting from the conventional flow properties or as a means of reducing the water to cement ratio to a lesser degree while still enhancing the flow properties.

More recently, copolymers of alkenyl ethers and acrylic acid or maleic anhydride, and derivatives thereof, have been proposed as agents suitable to enhance slump [Japanese Patent Publication (Kokai) Nos. 285140/88 and 163108/90]. Further, copolymers formed from the copolymerization of hydroxy-terminated allyether and maleic anhydride or the allyether and a salt, ester or amide derivative of maleic anhydride such as disclosed in U.S. Pat. No. 4,471,100 have been proposed as cement admixtures capable of enhancing slump. Still further, U.S. Pat. No. 5,369,198 teaches the use of maleic acid derivatized polymers as a suitable superplasticizer.

In each of the above instances, the proposed cement admixture agents when used in a cement composition do not provide the desired combination of properties or only provide them in low degrees. For example, esterified acrylate copolymers, while providing good slump enhancement, also causes the treated cement composition to exhibit excessive set retardation. In addition, it has been observed that polycarboxylates, such as described in U.S. Pat. No. 5,369,198, provide good slump but may introduce excessive amounts of air to the resultant structural formation. Although a certain degree of air in the form of microbubbles is desired to enhance freeze-thaw characteristics of the resultant structure, excessive air entrainment is not desired as it causes reduction in the strength of the structure formed. Various agents have been proposed to either enhance (air entrainers) or reduce (air detrainers) the air content by counteracting the effects other additives have on a particular cement composition. However, it has been found that the polycarboxylate superplasticizers are not readily mixed with conventional air detraining agents to provide a stable admixture composition. Attempts to form a stable composition has led to the proposal to dissolve certain defoaming agents in a miscible polymer or to disperse microparticles of the agents in the polymer to provide a single composition having the ability to enhance flowability without excessive air entrainment. However, these proposed compositions do not exhibit stability for extended periods. In commercial applications, they would not be stable during extended storage either by the producer and/or at the job site. Any separation would present dosage problems and not achieve the desired result.

It is highly desired to have a single, storage stable cement admixture which when administered to a structural hydraulic cement composition imparts a high degree of slump, causing high slump over an extended period of time, not causing excessive set retardation and providing suitable air entrainment properties to the resultant hydraulic cement structure. It is desired to have a cement admixture capable of providing the slump, set and air entrainment properties which is stable over an extended period from manufacture, storage shipping and job site storage without having the problems of dissociation, separation and the like.

SUMMARY OF THE INVENTION

The present invention is directed to an improved hydraulic cement admixture and to cement composition formed with said admixtures, wherein the admixture is an aqueous solution of an imidized acrylic polymer further having alkoxypolyoxyalkylene ammonium carboxylate units therein. The polymer can be represented by the general formula

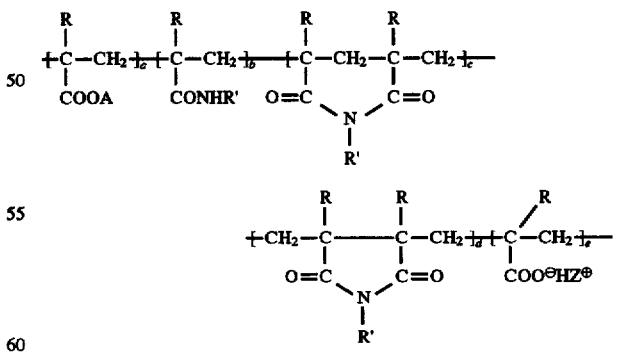

wherein each R independently represents hydrogen atom or a methyl ($CH_3$—) group; A represents hydrogen atom, a $C_1$–$C_{10}$ alkyl group, R' or an alkali or alkaline earth metal cation or ammonium cation or a mixture thereof; R' represents a hydrogen atom or a $C_2$–$C_{10}$ (preferably $C_2$–$C_4$) oxyalkylene group or a plurality (1–200, preferably from 1 to 70) of said groups which is terminated with a $C_1$–$C_{10}$ alkyl group (R''') or mixtures thereof; $HZ^{\oplus}$ represents an ammonium cation wherein Z is a group $X_2N(BO)_zR'''$ such that X represents hydrogen, $(BO)_zR'''$ or mixtures thereof and R''' represents H, $C_1$–$C_{10}$ alkyl group or $BNH_2$; B represents a $C_2$–$C_{10}$ alkylene (preferably $C_2$–$C_4$ alkylene) group or mixture of said groups and z is from 5 to 200 (preferably 10 to 100 and most preferably from 10 to 50); and a, b, c, d and e represent molar percentages of the polymer's structure such that a has a value of about 50 to 70; the sum of c plus d is at least 2 to a value of [100–(a+e)] and is preferably from 2 to 10; and b is not more than [100–(a+c+d+e)] and e is 0.1 to 10.

Cement compositions formed with the improved cement of the present invention have been found to exhibit a high degree of slump over a sustained period of time while not having any significant set retardation and are unexpectedly capable of imparting desired air controlling properties.

DETAILED DESCRIPTION OF THE INVENTION

The present invention is directed to an improved cement admixture. The presently described improved cement admixture product has been unexpectedly found to be stable over an extended period of time while being capable of imparting to a cement composition, such as mortar or concrete, high flowability over a sustained period of time without imparting a significant delay in the initial set time of the composition and providing desired air entrainment to the resultant structure. Thus, the presently achieved cement compositions are capable of being readily formed into a desired shape, having substantial self-leveling properties and can be worked over an extended period from commencement of hydration. At the same time, the presently achieved cement compositions do not exhibit extensive delay in set and, therefore, do not delay the timetable for forming the desired structure. Finally, the present cement composition can readily achieve the desired degree of air control without the need for a separate air detraining agent either by separate application or as a mixed product which typically separates from solution upon standing.

The cement admixture product of the present invention is composed of an imidized acrylic polymer, as fully described below, alone or as a uniform mixture with hydraulic cement. The cement can be selected from any conventional hydraulic cements such as, for example, normal portland cement (meeting the requirements of ASTM C-150), high early strength portland cement, ultra high early strength portland cement, blast-furnace slag cement, fly-ash cement, blended portland cements, calcium aluminate cements, calcium sulfate cements, magnesium phosphate cements and the like.

The subject polymers are ammonium salts of imidized acrylic polymers. The term "acrylic polymer", as used herein and in the appended claims can be selected from homopolymer or copolymer of acrylic acid, methacrylic acid, their alkali metal and ammonium salts as well as their $C_1$–$C_{30}$ alkyl esters and/or polymers formed from other monomeric compounds having ethylenic unsaturation suitable for vinyl polymerization and providing alpha-beta or alpha-gamma positioned carboxylic acid groups, such as maleic anhydride, maleic acid and salts thereof. In addition, the acrylic polymer reactant and the resultant imidized acrylic polymer may contain units derived from other singly and doubly ethylenically unsaturated monomers, such as styrene, alpha-methylstyrene, sulfonated styrene, acrylonitrile, butadiene and the like. Such other ethylenically unsaturated, monomer units, when present, can be present in the subject polymer in amount of up to about 20 (preferably, up to about 10) weight percent of the total polymer provided that the resultant imidized acrylic polymer is water soluble. Such other ethylenically unsaturated monomer derived units, although not shown in the structural formula exemplifying the subject imidized acrylic polymer, are contemplated to optionally be a part thereof.

The imidized acrylic polymer found useful in the present invention has a structural formula (I) of:

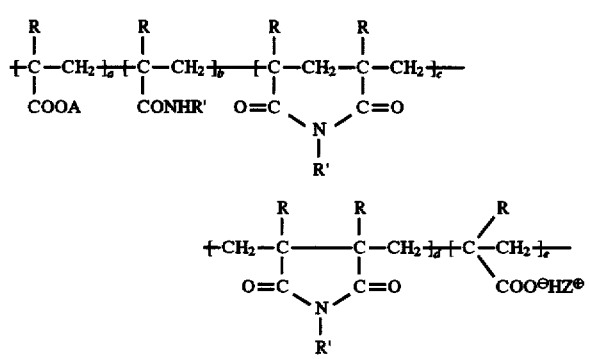

wherein each R independently represents hydrogen atom or a methyl ($CH_3$—) group; R' represents a hydrogen atom or a $C_2$–$C_{10}$ (preferably $C_2$–$C_4$) oxyalkylene group (BO) or a plurality (1–200, preferably from 1 to 70) of said groups which is terminated with an R'' group which represents a $C_1$–$C_{10}$ alkyl (preferably $C_1$–$C_4$ alkyl) group or mixtures thereof; A represents a hydrogen atom, a $C_1$–$C_{10}$ alkyl group, R' or an alkali or alkaline earth metal cation or ammonium cation or mixtures thereof; $HZ^{\oplus}$ represents an ammonium cation wherein Z is a group $X_2N(BO)_zR'''$ such that X represents hydrogen, $(BO)_zR'''$ or mixtures thereof and R''' represents H, $C_1$–$C_{10}$ alkyl group or $BNH_2$; B represents a $C_2$–$C_{10}$ alkylene (preferably $C_2$–$C_4$ alkylene) group or mixture of said groups and z is from 5 to 200 (preferably 10 to 100 and most preferably from 10 to 50); and a, b, c, d and e represent molar percentages of the polymer's structure such that a is an integer of from about 50 to 90; the sum of c plus d is at least about 2 to a value of [100–(a+e)] and is preferably from 2 to 10; e is a value of 0.1 to about 10, preferably from 0.2 to 2; and b is not more than [100–(a+c+d+e)].

A preferred imidized polymer of the present invention has "e" monomeric units composed of carboxylic acid-ammonium salt in at least 0.1 molar percent of the polymer structure. The BO units of these ammonium salts should be a plurality of from 5 to 200 units per chain forming the salt and the units are preferably from 10 to 100 and most preferably from 10 to 50 units. The BO oxyalkylene units are preferably a mixture of $C_2$–$C_4$ alkylene oxide units wherein a major portion (at least 50 percent) are $C_3$–$C_4$ alkylene units with the remainder being $C_2$ units. For example, the oxyalkylene chain can be a polyoxypropylene/polyoxyethylene random or block chain in which the majority is oxypropylene units, preferably a ratio of PO/EO of at least 5:1 and most preferably at least 10:1. In certain instances the chain may be formed entirely of $C_3$–$C_4$ units or mixtures thereof. It is believed that these salt units provide the air detraining properties to the subject polymer. The exact amount of these units in a particular polymer product (value of e) will depend on the exact air controlling properties desired from a particular polymer of the present invention. Polymers not having the ammonium salt desired herein have poor air controlling properties.

The preferred imidized polymer is represented by the above formula in which A is a hydrogen atom; R' is at least from 50 to 90 weight percent of the polymer and comprises polyoxyethylene or polyoxypropylene units or mixtures thereof and the ammonium cation, has BO units formed from a polyoxyethylene/polyoxypropylene random or block units and R'" is a methyl, ethyl, or propyl group.

Further, a preferred polymer of the present invention has a portion of the molar percentage of the "a" monomeric units composed of units wherein A represents covalently bonded R' units and the remainder of A represents alkali metal ion. The amount of "a" units wherein A represents R' can be from 2 to 30 percent of the total "a" molar units. Still further, it is preferred that "a" has a numerical value of from 60–70; and the sum of "c" plus "d" is a numerical value of at least 3 to a value of [100–(a+e)].

The present acrylic polymer may be formed by a process of reacting a preformed acrylic polymer with at least one derivatizing reactant capable of covalently bonding between the carbonyl groups and primary amine containing compound, as fully described herein below. The reactants can further include secondary amine-containing heterocyclic compounds and/or hydroxy terminated oxyalkylene compounds. The derivatizing reactants should be used in less than the stoichiometric equivalent with respect to the carbonyl functional groups of the polymer. The use of a preformed acrylic polymer provides a resultant cement admixture product of well controlled molecular weight and of the desired constituents.

The acrylic polymer reactant useful herein are low molecular weight polymers which are soluble in polar solvents such as water. They should have a number average molecular weight of from about 1,000 to 100,000, preferably from about 1,500 to 20,000. The acrylic polymer reactants of both homopolymer and copolymer character are formed by conventional free radical polymerization and are commercially available.

The acrylic polymer admixture of the present invention is formed by initially reacting an acrylic polymer with ammonia or an alkoxylated amine. When an alkoxylated amine (preferred) is used as a reactant, the imidization may be carried out neat, as the acrylic polymers are soluble in such amines. However, the reaction should be carried out so that at least 50 molar percent of the carboxylic acid groups remain unreacted and are not formed into amide and/or imide groups.

The amine reactant useful in forming the desired amidized/imidized acrylic polymer can be selected from ammonia or an alkyl-terminated polyoxyalkylene amine represented by the formula:

$$H_2N-(BO)_n-R''  \quad (II)$$

in which BO represents a $C_2$–$C_{10}$ (preferably a $C_2$–$C_4$) oxyalkylene group in which O represents an oxygen atom and B represents a $C_2$–$C_{10}$ (preferably $C_2$–$C_4$) alkylene group or mixture; and R" represents a $C_1$–$C_{10}$ (preferably $C_1$–$C_4$) alkyl group and n is an integer selected from 1 to 200 preferably from 10 to 120.

In addition to the polyoxyalkylene amine reactant, the acrylic polymer can be further formed with hydroxy terminated polyoxyalkylenes represented by the formula

$$HO-(BO)_n-R'' \quad (III)$$

wherein BO, R" and n are defined in formula II above. The hydroxy terminated compound, when present, is normally used in a mole ratio of amine terminated to hydroxy terminated compound of from about 0.5 to 1.5, preferably from about 1 to 1.5. The compounds of formula III react with the carboxyl groups of the acrylic polymer to provide a portion of the A constituent of the amidized/imidized acrylic polymer product of formula I.

The subject polymer can also contain small amounts of derivatives of compounds II and III in which R" of compound II is a primary amino group and R" compound III is a hydroxyl group. Such derivatives have the formula Z(BO)$_n$Z where each Z is a primary amino or a hydroxyl group. The resultant polymer provides extended high slump properties. These derivatives may be present in up to 8 percent, preferably up to 5% provided that the resultant product remains water soluble.

The total polyoxyalhylene containing reactants are normally used in from about 5 to 90 mol percent and preferably from 10 to 20 mol percent based on the acrylic acid units present in the acrylic polymer.

The acrylic polymer and amine reactants alone or further combined with a hydroxy terminated reactant form the desired imidized acrylic polymer by heating the reactants either in an aqueous solution or neat at elevated temperatures of from about 60° C. to 250° C. and most preferably from 100° C. to 225° C. The reaction is carried out under ambient pressure or, under a pressure lower than ambient pressure. Further, when the reaction is carried out under ambient or substantially ambient pressure it is preferred to conduct the reaction while passing air or nitrogen gas over the liquid reaction medium or by bubbling the gas through the medium to remove water and other low molecular weight by-products from the reaction zone.

A catalyst may be employed to further the reaction and to permit reduction of the reaction temperature. Catalyst enhanced reaction normally can be carried out at temperatures of at least about 60° C., preferably from about 100° to 140° C. The desired imidization occurs more readily when using higher reaction temperatures. Therefore, when optional reactants are also employed it is desired to carry out the reaction as a two step process by first heating the reactants to greater than 150° C. for a period of time to cause the primary amine reactant to substantially combine with the polymer carboxyl groups and then to lower the reaction temperature to 75°–140° C. (preferably 100° to 130° C.), introduce a catalyst, as described below, and maintain the lower temperature for a period to permit substantial completion of the reactants with the acrylic polymer.

The optimum condition will depend on the particular reactants used and the degree of reaction desired. The exact condition can be determined by simple experimentation.

The imidization reaction can be enhanced by conducting the reaction in the presence of a basic catalyst, an acid catalyst and/or a transamination catalyst. Such catalysts may be selected from a tertiary amine, such as dicyclohexylamine, 1,1,3,3-tetramethyl-guanidine, 1,3-diphenylguanidine, quinoline, isoquinoline, 4-benzylpyridine, 4-phenylpyridine, 2,3-benzodiazine, 1,4-benzodiazine, 1-benzazine, 1,3-benzodiazine, N,N'-dicyclohexylcarbodiimide, 2,2'-bipyridyl, 2,3'-bipyridyl, 2,4'-bipyridyl or such catalyst can be selected from the group consisting of p-toluenesulfonic acid, HCl, Sb$_2$O$_3$, Ti—(OC$_4$H$_9$)$_4$, NaNH$_2$, SnO$_2$, potassium or sodium alkoxides, manganese acetate, and the like. The catalyst can be present in amounts of from 0.1 to 5 weight percent based on the amine reactant.

The reactants are contacted with each other at the above described reaction conditions for from about 1 to 8 hours and preferably from about 1.5 to 3 hours. During the course of the reaction, water (a by-product) is removed to drive the reaction to imidization. When the reaction is carried out at ambient or substantially ambient pressure, the removal of water can be enhanced by sweeping a gas, such as nitrogen, through the reaction zone.

The degree of reaction can be substantially monitored by the amount of water removed from the reaction zone. Upon completion of the reaction, the reaction product is cooled and filtered.

The imidized acrylic polymer is normally a high-boiling viscous liquid which is substantially soluble in water. The initially formed imidized acrylic polymer is taken up in an aqueous solution. The pH of the solution is adjusted or maintained to below 6.5, preferably from about 3 to 6 and most preferably from 3 to 5. An amine terminated polyoxyalkylene is introduced into the aqueous solution to provide an ammonium salt with at least a portion of the remaining free carboxylic acid units of the polymer. The amine terminated polyoxyalkylene used to produce the salt is preferably selected compounds of Formula IV $$X_2N(BO)_zR'''\qquad\text{(IV)}$$

wherein X represents hydrogen, $(BO)_zR'''$ or mixtures thereof and $R'''$ represents H, $C_1$–$C_5$ alkyl group or $BNH_2$; B represents a $C_2$–$C_{10}$ alkylene (preferably $C_2$–$C_4$ alkylene) group or mixture of said groups and z is from 5 to 200 (preferably 10 to 100 and most preferably from 10 to 50). The molar amount of acrylic acid-ammonium polyoxyalkylene units which are present in the polymer admixture (represented by "e") may range from about 0.1 to 10 and preferably from about 0.2 to 2.

It has been unexpectedly found that the presence of units "e" of the subject polymer admixture provide superplasticizer properties with the ability of achieving air content (in the form of microvoids) of less than 5 percent by volume and preferably less than 3 volume percent in concrete compositions. Similarly, the subject polymer can achieve reduced air content in mortar compositions of less than 6 percent and preferably less than 4 percent. If higher amounts of air content is desired, the cement composition can be treated with conventional air entrainers. The present polymer does not detract from conventional air entrainer activity. The exact molar amount of units "e" to achieve the air controlling properties will depend upon the exact nature and molar proportion of the other components of the polymer admixture as well as the nature of the cement composition being treated. The molar amount of units "e" needed to achieve a desired air entrainment level can be readily determined by experimental design with the aid of the present teaching.

It has been unexpectedly found that aqueous solutions of the subject polymer admixture is storage stable over extended periods of time. Thus, the forming solution having a pH of less than 6.5 can be used as the product solution which can be stored, shipped, and retained at the job site without exhibiting separation or other stability problems associated with prior known mixtures of agents.

The improved cement of the present invention is composed of a substantially uniform mixture of the hydraulic cement and the imidized acrylic polymer which are both described herein above. The imidized acrylic polymer should be present in from 0.005 to 5 (preferably from 0.03 to 1 and most preferably from 0.05 to 0.3) weight percent based on the weight of hydraulic cement. In order to aid in forming the uniform mixture, the imidized acrylic polymer can be mixed with the cement as an aqueous solution having from about 30 to 50 weight percent imidized acrylic polymer solids in the solution.

The imidized acrylic polymer treated cement can be formed at any stage of the cement's formation or use. For example, the polymer can be mixed at the cement mill with clinker cement raw material during its grinding to form cement powder. It can also be applied to the cement powder during its blending with other dry materials to prepare a specific type of cement, such as blended cement, pozzolanic cement and the like.

Alternately, the improved cement can be formed in situ during the course of preparing a cement composition such as a mortar mix (hydraulic cement, sand and water) or a concrete (hydraulic cement, sand, large aggregate, such as stone, and water). The subject imidized polymer can be added (conventionally as an aqueous solution) as part of the water of hydration or can be added separately. In the later method of application, the water of the aqueous polymer solution should be calculated as part of the total water content of the cement composition. The total water to cement ratio of a structural cement composition is normally from 0.2 to 0.8 with from 0.35 to 0.65 being preferred. The present superplasticizer polymer admixture permits one to reduce the water to cement ratio while retaining or even enhancing slumps to thus provide a structural product of enhanced strength.

The present polymer is soluble in water in all proportions and is capable of remaining as a solute therein to provide a storage stable admixture. It is preferred to have the solution at a pH of less than 6.5, preferably from 3 to 5 and the polymer is present in from 10 to 50 weight percent, preferably from 25 to 45 weight percent.

As stated above, the ammonium salt of the imidized acrylic polymer of the present invention provides an improved cement (whether as a dry blend of cement and polymer or as formed in situ as part of the formation of a wet unset cement composition) when the polymer product is present in from 0.005 to 5, preferably 0.01 to 2, more preferably from 0.03 to 1 and most preferably from 0.05 to 0.3 weight percent of solid polymer product based on the weight of solid hydraulic cement of the cement composition.

Cement compositions formed with the present improved cement have a significantly higher degree of flowability (higher degree of slump) than compositions formed with conventional hydraulic cement. Further, the present cement compositions are capable of retaining their high degree of slump over a sustained period of time giving the artisan an extended period to work the cement composition into its final shape. Still further, the present cement composition achieves initial set without exhibiting excessive retardation. Thus, the use of this cement composition does not cause delay of the working time required to form a particular structure. Finally, the treated cement composition exhibits desired air entrainment properties to provide a strong and durable structural product.

Conventional cement additives, such as air entrainers, water proofing agents, strength enhancers, corrosion inhibitors, and curing accelerators and the like can be used with the subject cement additive. These additives can be mixed with the cement composition prior to, along with or subsequent to the addition of the present cement additive.

The present invention is further explained by the following examples which are given for illustrative purposes only and are not meant to limit the invention, as defined by the claims, appended hereto. All parts and percentages are by weight unless otherwise stated.

EXAMPLES

Example 1

40 parts of a 50% aqueous solution of a polyacrylic acid of 5000 molecular weight was combined with 80 parts of a polyethylene-polypropylene oxide polymer of molecular weight 2000 which was terminated at one end by a primary amine group and at the other end by a methyl group. The mixture was heated and maintained at 180° C. while under flowing nitrogen gas stream for a total of 2 hours. The water of solution and formed as by-product was removed in the nitrogen gas stream. The resulting product was an amber viscous liquid.

Example 2

40 parts of solid polyacrylic acid of 5000 molecular weight was added to 60 parts of a polyethylene-polypropylene oxide polymer of molecular weight 700 which is terminated at one end with a primary amine group and at the other end by a methyl group. The reaction mixture was stirred for 30 minutes at ambient temperature followed by 1 hour and 10 minutes at 180° C. under a blanket of flowing nitrogen gas. The water by-product was removed in the nitrogen gas stream. The resultant product was a viscous amber liquid. The liquid was analyzed by infrared spectroscopy and the resultant spectra had peaks at 1720 $cm^{-1}$, 1630 $cm^{-1}$, and 750 $cm^{-1}$ which indicates the presence of imide groups. This liquid was also analyzed by conductiometric titration and the nitrogen linkages were found to have an 4:1 amide:imide group ratio.

Example 3

7.5 parts of solid polyacrylic acid of 2000 molecular weight was dissolved in 7.7 parts deionized water. To this resultant solution was added 52.1 parts of a polyethylene-polypropylene oxide polymer of molecular weight 2000 which was terminated at one end by a primary amine group and at the other end by a methyl group. The mixture was heated and maintained at 180° C. under a flowing nitrogen gas blanket for a total of 2 hours to remove the water of solution and that formed as a reaction by-product. The resulting product was an amber viscous liquid.

Example 4

The polymer product of Example 1 above was introduced into water to form a 40 wt percent aqueous solution. This solution had a clear, amber color and a pH of 4.0. Alkoxylate amines as described below, were introduced into separate samples of the solution in a dosage of 2 weight percent based on the weight of polymer contained in the solution. The alkoxylated amines were:

---
1. Methoxy terminated polypropylene oxide/polyethyleneoxide mono amine
   M.W. = 2000    PO/EO = 10:1
2. Polyoxypropylene terminated with primary amine groups
   M.W. = 2000    PO only
3. Poly propylene oxide based triamines with glyceryl triol initiator.
   M.W. = 5000    85 moles PO total
4. Tri(hydroxy terminated polyoxypropylene/polyoxyethylene) amine (commercially sold as Tetronic 901 by BASF)
---

Each of the solutions were stirred for about 0.5 hours at ambient temperature and pressure to produce solutions having a pH of 4.5. The resultant solutions were stored at ambient conditions for about 90 days without showing any phase separation.

Example 5

Salt products are prepared in the same manner as described herein above in Example 4 with each of polymers formed according to Examples 2 and 3 above. The resultant solution show no instability over extended periods of time.

Example 6

The ammonium salt polymers formed according to Example 4 above were each tested as part of an ordinary portland cement mortar in a method for slump based on Japanese Industrial Standard (JIS) A 6204 and for air content based on ASTM C-185. The sand/cement/water ratio of 3/1/0.42 was used in each instance. The dosage of the polymer was 0.12 percent based on solid polymer to solid cement (s/s) in the mortar. Set times were measured using an automated penetrometer. Results are given in Table 1 below.

TABLE 1

| Polymer Admixture | Ammonium salt (wt % of Polymer) | Slump (cm) | Air (% vol.) | Final Set (min.) |
|---|---|---|---|---|
| 1 | 2% | 8.5 | 4.8 | 208 |
| 2 | 2% | 8.8 | 4.9 | 228 |
| 3 | 2% | 8.1 | 5.2 | 245 |
| 4 | 5% | 9.8 | 3.8 | 238 |
| Imidized acrylic polymer (no salt) | — | 10.5 | 12 | 255 |
| Blank | — | 2.1 | 4.4 | 155 |

What is claimed:

1. An improved cement comprising a essentially uniform mixture of a hydraulic cement and from 0.01 to 2 weight percent based on the weight of said hydraulic cement of an imidized acrylic polymer represented by the structure of:

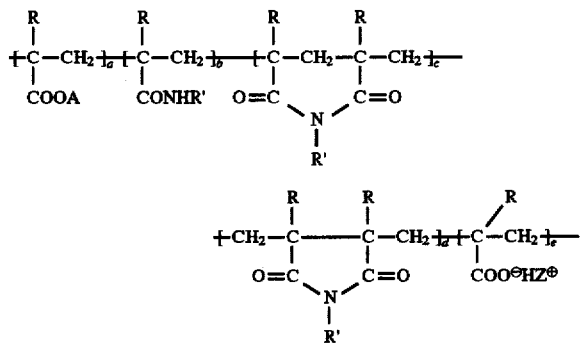

wherein each R independently represents hydrogen atom or a methyl ($CH_3$—) group; R' represents a hydrogen atom or a $C_2$–$C_{10}$ oxyalkylene group represented by $(BO)_nR''$ in which O represents an oxygen atom, B represent $C_2$–$C_{10}$ alkylene group or mixtures thereof, R'' represents a $C_1C_{10}$ alkyl and n represents an integer of from 1—200, or mixtures thereof; A represents hydrogen atom, a $C_1$–$C_{10}$ alkyl group, R' or an alkali metal, alkaline earth or ammonium cation or a mixture thereof; $HZ^⊕$ represents an ammonium cation wherein Z is a group $X_2N$ $(BO)_zR'''$ such that X represents hydrogen, $(BO)_zR'''$ or mixtures thereof and R''' represents H,, $C_1$–$C_{10}$ alkyl group or $BNH_2$; B represents a $C_2$–$C_{10}$ alkylene group or mixture of said groups and z is from 5 to 200; and a, b, c, d and e are numerical values representing molar percentage of the polymers structure such that a is a value of about 50 to 90; the sum of c+d is a value of from about 2 to the numerical value of [100−(a+e)]; and b is not more than [100−(a+c+c+e)]; and e is a value of from 0.1 to about 10.

2. The improved cement of claim 1 wherein $HZ^⊕$ is an ammonium polyoxyalkylene cation wherein R''' represents $C_2$–$C_4$ alkyl, O represents oxygen, B represents propylene or ethylene or mixtures thereof and z has a numerical value of from 10 to 100.

3. The improved cement of claim 2 wherein e represents a molar percentage of from about 0.2 to 2.

4. The improved cement of claim 2 wherein the ammonium polyoxyalkylene cation has a polyoxyalkylene chain comprising a mixture of oxypropylene/oxyethylene units in a ratio of at least 5:1.

5. The improved cement of claim 1 wherein R' represents a oxyalkylene group $(BO)_nR"$ wherein B is a $C_2$–$C_4$ alkylene group; and n is an integer of from 1 to 70.

6. The improved cement of claim 2 wherein at least a portion of A represents an oxyalkylene group $(BO)_nR"$ wherein B is a $C_2$–$C_4$ alkylene group; and n is an integer of from 1 to 70.

* * * * *